United States Patent [19]

Nishiyama et al.

[11] Patent Number: 5,110,663

[45] Date of Patent: May 5, 1992

[54] ULTRA-HIGH-MOLECULAR-WEIGHT POLYETHYLENE AND METHOD FOR ITS MANUFACTURE

[75] Inventors: Masashi Nishiyama; Hideaki Fujii; Tatsumi Takahashi, all of Tokyo, Japan

[73] Assignee: Dai Nippon Insatsu Kabushiki Kaisha, Japan

[21] Appl. No.: 548,934

[22] Filed: Jul. 31, 1990

[30] Foreign Application Priority Data

Dec. 29, 1988 [JP] Japan ................. 63-333919
Mar. 25, 1989 [JP] Japan ................. 1-72789
Apr. 18, 1989 [JP] Japan ................. 1-99675

[51] Int. Cl.$^5$ ................................ B32B 9/00
[52] U.S. Cl. ......................... 428/195; 428/220; 428/323; 428/332; 428/333; 428/334; 428/516; 428/694; 428/910; 264/104; 264/106
[58] Field of Search ............. 428/480, 520, 694, 195, 428/910, 323, 332, 333, 334, 220, 516; 264/104, 106

[56] References Cited

U.S. PATENT DOCUMENTS

4,957,787 9/1990 Reinhardt et al. ............ 428/24

Primary Examiner—Patrick J. Ryan
Attorney, Agent, or Firm—Parkhurst, Wendel & Rossi

[57] ABSTRACT

An ultra-high-molecular-weight polyethylene sheet characterized in that it is formed into a sheet-like material of 100 to 300 μm in thickness by extruding into a sheet form a feed polyethylene comprising an ultra-high-molecular-weight polyethylene having a viscosity-average molecular weight of 300,000 to 2,000,000.

17 Claims, 6 Drawing Sheets

ULTRA-HIGH-MOLECULAR-WEIGHT POLYETHYLENE AND METHOD FOR ITS MANUFACTURE

TECHNICAL FIELD

The present invention relates to a sheet-like part or piece extruded or otherwise formed of ultra-high-molecular-weight polyethylene and, more particularly, to a thin sheet or sheet-like sliding member such as a tape pad for magnetic tapes and a slip sheet for floppy disks.

BACKGROUND TECHNIQUE

Heretofore, plastics have been widely used in the form of thin sheet-like or sheet-form sliding members such as tape pads employed as components of magnetic tape cassettes and slip sheets for floppy disks.

For instance, the tape pads are thin sheet-like components designed to prevent sagging and "coiling-around" of magnetic tapes running through cassettes. Such tape pads have hitherto been formed primarily of PET films.

For instance, proposals have been made of antistatically treated PET films or materials comprising backing PET films and about 100 to 200 μm thick thin films of ultra-high-molecular-weight polyethylene or polytetrafluoroethylene (PTFE for short) which are antistatically treated in consideration of abrasion resistance and bonded to their regions of contact with magnetic tapes (see Japanese Patent Application Kokai Nos. 57(1982)-37950, 56(1981)-105373 and 56(1981)-10537). Generally, since plastics are likely to be electrified, means are often taken for escaping charges generated by their contact with tape surfaces by adding to them antistatic additives such as carbon.

Usually, the tape pads should have such properties as set out below:

(1) Suitable tension to prevent sagging of magnetic tapes during their transportation;

(2) Abrasion resistance to prevent the pads and the associated tapes from wearing off;

(3) Frictional force sufficiently low to ensure smooth traveling of tapes; and (4) Sliding surfaces with a curvature sufficient to prevent tapes from being bruised.

Heretofore, films or sheets of ultra-high-molecular-weight polyethylene have generally been made by the following techniques:

(a) Films or sheet-like pieces are cut out of sheet or rod-like molded parts obtained by compression molding;

(b) Ultra-high-molecular-weight polyethylene is dissolved in an organic solvent, followed by film or sheet forming by casting;

(c) Ultra-high-molecular-weight polyethylene, to which an organic solvent has been added, is extruded, and the extruded product is then formed into a film or sheet by the volatilization of the organic solvent (Japanese Patent Publication No. 63(1988)-19327).

Problems with the technique (a) are that it is very poor in productivity and provides sheets having unsatisfactory surface smoothness. Drawbacks with the technique (b) are that a solution of ultra-high-molecular-weight polyethylene is not only so high in viscosity that it is difficult to handle, but is also so unstable that crystals, for instance, can precipitate out depending upon the temperature conditions selected. This is also a low commercial productivity and so it is not said to be a satisfactory method. Comprising three steps of adding the organic solvent to ultra-high-molecular-weight polyethylene, extruding that ultra-high-molecular-weight polyethylene and removing the solvent from the resulting sheet, the technique (c) is much more simplified in the steps involved than the above techniques (a) and (b) and offers significant advantages over them. Problems with this technique, however, are that the extrusion of the solvent-containing resin is so accompanied by heating that there can be the fear of inflammation, the step of removing the solvent by volatilization is not energy-effective, and the recovery of the solvent is time-consuming and involves much labor.

Some problems with such conventional tape pads originate from the properties of the materials used and some arise from the processing techniques applied. Of note in connection with the materials used is that in view of the principles of friction or tribology, a material of larger momentum should basically be harder than its associated material of smaller momentum. In other words, a tape material (PET film) should fundamentally be harder than its associated tape pad. Under such conditions, the amount of abrasion is considered to be minimized. It is also found that when materials that contact each other are of the same type, their relative abrasion is most likely to be increased.

In view of tribology, however, the materials used for conventional tape pads, especially PET films which are used per se as tape pads, are not in ideal conditions at all. This is because marked wear takes place between the polymeric material for a tape pad and the base film of a magnetic tape, both formed of PETs.

Polytetrafluoroethylene (PTFE), on the other hand, has a low coefficient of friction and is ideal in this sense, but poses a wear resistance problem that it cannot stand up to long-term use, because of its own property of keeping its coefficient of friction low by self-wearing.

Typical means taken today to avoid such a problem are set forth in Japanese Patent Application Publication Nos. 1982-37950, 1981-105373 and 1981-105374, in which highly wear-resistant films such as ultra-high-molecular-weight polyethylene films are used for the surfaces of tape pads to contact tapes together with PET supports or backings, thereby preventing the tape pads from being worn away and the tapes' magnetic surfaces from being bruised.

Required for the achievement of this, however, is the additional step of bonding the ultra-high-molecular-weight polyethylene films to the PET films, which offers problems in connection with mass production and cost effectiveness.

Now, forming sheets of ultra-high-molecular-weight polyethylene is still carried out with sheet-forming techniques requiring post-processing, for lack of any effective technique for forming sheets by single-stage extrusion.

Heretofore, extruding polyethylene into sheets has generally been performed with a polyethylene feed having a molecular weight lying between 20,000 and 200,000. It is known in the art that polyethylene having such a molecular weight can be extruded with relative ease, but difficulty is encountered in extruding sheets from polyethylene having a molecular weight exceeding that upper limit.

Problems with the above polyethylene having a molecular weight between 20,000 and 200,000, however, are that it is inferior in wear resistance and impact resistance to ultra-high-molecular-weight polyethylene such as polyethylene having a molecular weight exceeding 200,000. As techniques capable forming such ultra-high-molecular-weight polyethylene into sheets, on the other hand, ram extrusion has been mainly used but this can only can yield thick-walled products having a thickness of, say, 1 mm or higher.

SUMMARY OF THE INVENTION

In view of such conventional techniques as mentioned above, an object of the present invention is to provide a technique for extruding ultra-high-molecular-weight polyethylene excelling in wear resistance, impact resistance and sliding properties into sheet-like parts or articles having a thickness of 100 to 300 μm.

Another object of the present invention is to provide a technique for producing thin sheet-like or sheet-like sliding members such as tape pads for VTR magnetic tapes and slip sheets for floppy disks from the thus extruded ultra-high-molecular-weight polyethylene sheets.

The ultra-high-molecular-weight polyethylene sheets of the present invention are characterized in that a feed polyethylene comprising an ultra-high-molecular-weight polyethylene having a viscosity-average molecular weight of 300,000 to 6,000,000 is extruded in the form of sheets, thereby obtaining sheet-like parts having a thickness of 100 to 300 μm.

In the present invention, the feed polyethylene may be a polyethylene mixture in which one or more polyethylenes having a relatively high molecular weight is or are mixed with one or more polyethylenes having a relatively low molecular weight, and may additionally contain inorganic matter.

The ultra-high-molecular-weight polyethylene sheets of the present invention can be obtained by extruding a feed polyethylene comprising an ultra-high-molecular-weight polyethylene having a viscosity-average molecular weight of 300,000 to 6,000,000 into sheet-like parts having a thickness of 100 to 300 μm with a screw extruder with an L/D ratio, wherein L is the length of the screw flight portion and D is the screw diameter, being fixed at 20 to 40 and an angle of aperture of the coathanger portion being fixed at 120 to 170.

The tape pads for magnetic tapes according to the present invention can be produced only by subjecting the sheets obtained as mentioned above to combined slitting and drawing in the desired form. Therefore, the present invention can dispense with the complex separate steps required in the prior art such as those for bonding materials excelling in sliding properties to tape pad substrates, simplifying the process of production and achieving considerable cost reduction.

BEST MODE FOR CARRYING OUT INVENTION

In what follows, the present invention will be explained specifically but not exclusively with reference to the production of tape pads for VTR magnetic tapes.

Commonly, tape pads, generally shown at 1, for VTR magnetic tapes are in the form of such strips as sketched in FIGS. 3A-3E and FIG. 4A, say, about 13.5 mm in width, about 25 mm in length and about 160 μm in thickness. These examples are intended to be used with ½-in, wide magnetic tapes for VTRs. It is therefore understood that depending upon the width of tapes and the structure of cassette tapes, the tape pads may be varied in width, length and thickness.

The tape pads are not limited to a simple strip-like geometry, and may assume any desired geometry capable of having a flexural modulus best-suited for tape traveling, i.e., geometries including thin-walled portions, bends, etc. Basically, it is desired that the tape pads be made uniform on their surfaces of contact with tapes and have a curvature (R).

Preferably, the material of which the tape pads of the present invention are formed is a polyethylene having a molecular weight of 300,000 to 2,000,000. More preferable to this end is an ultra-high-molecular-weight polyethylene having a molecular weight of 800,000 to 1,500,000.

The present inventor has made a tribological measurement of the tape surfaces of magnetic tapes and the tape pads of polyethylene. As a result, it has turned out that at a molecular weight less than 300,000 the polyethylene is worn away by the tape surfaces, whereas the tape surfaces are bruised at a molecular weight higher than 2,000,000.

Referring to this point in further detail, tape pads are generally required to have wear resistance, stiffness durability (viz., nerve) and a low coefficient of friction and cause no damage to tapes. The inventor's finding has showed that a polyethylene having a molecular weight less than 300,000 is equivalent to ordinary high-density polyethylene in terms of wear resistance and stiffness and cannot fulfill the functions required for tape pads. An ultra-high-molecular-weight polyethylene having a molecular weight higher than 2,000,000, on the other hand, mars the tape surfaces due to its surface hardness.

It is noted that polyethylene tape pads and tape surfaces have frictional electrification and static electricity problems in addition to the frictional wear problem. Since PET films forming part of tape surfaces and polyethylene are both good insulator materials, polarization of charges takes place on their surfaces. For this reason, the force of attraction by charges occurs between the PET films and the polyethylene tape pads, giving rise to a phenomenon in which the films are attracted to the tape pads. The magnetic surfaces of the tapes are also likely to be dusted.

This problem can effectively be solved or overcome by the addition of specific additives and, more illustratively, by the addition to polyethylene of one or more inorganic materials such as carbon, gold, silver, aluminium, copper, chromium, nickel, iron, lead, molybdenum, zinc, tin, indium, bismuth, platinum, selenium, magnesium, manganese, cobalt, tungsten, titanium, germanium and mercury, all being electrically conductive.

The preferred additives are carbon, gold, silver, aluminium, copper, iron, lead and nickel, which are more effectively used alone or in combination of two or more in view of economical consideration and electrical properties.

The addition of organic additives is also effective for improving the sliding properties of tape surfaces relative to tape pads. For instance, mention is made of oligomers based on hydrocarbons, polyethylene wax, silicone oil, fluorine plastics, fluorine surfactants, etc., which are preferably added to polyethylene in amounts of 0.01 to 10% by weight. The organic materials to be added to said polyethylene need not be limited to one type, and may effectively be used in any combination of two or more, depending upon the properties of the tape pads required.

The electrically conductive material or materials may be added to the polyethylene in an amount of preferably 0.1 to 20% by weight, more preferably 1 to 8% by weight.

In order to make the electrically conductive material or materials and the additive or additives for improving the sliding properties composite with the polyethylene, they may be fast-agitated with the polyethylene resin used at a temperature equal to or lower than its melting point, thereby making use of heat generated by the friction occurring between the resin and the additives. If the stirring atmosphere used is an inert gas, it is then possible to avoid a reduction in the molecular weight of the polyethylene due to oxidation. The polyethylene resin used has a particle size of 10 to 300 μm, preferably 50 to 200 μm, while the additives have suitably a particle size of 0.01 to 100 μm, preferably 0.05 to 10 μm.

Illustrative procedures for composite making are as follows.

Polyethylene particles are agitated with additive particles at high speed in an inert gas atmosphere. The agitating conditions are:

the agitation blade rotating at 100 to 10,000 rpm, preferably 300 to 3,000 rpm, the initial temperature of the chamber being preset at 50° C., and agitation being continued until a temperature of 80° to 120° C. is reached by the heat generated by friction due to agitation.

The present inventor has already found that composite making occurring under the above conditions brings the additive into close contact with the surfaces of the polyethylene resin particles, thereby making it possible to impart electrical conductivity and slidable properties to the polyethylene in a small amount of the additives at the time of molding. One possible means meeting the above composite making conditions is a Henschel mixer. For details, see Japanese Patent Publication Nos. 1988-011906, 1986-008698, 1986-008699 and 1986-016183. For or in carrying out the present invention, the techniques set forth in such publications may be utilized.

Reference will now be made to how to extrude the ultra-high-molecular-weight polyethylene having the composition resulting from the above procedures.

First of all, reference is made to improvements in ultra-high-molecular-weight polyethylene resin. Heretofore, it has been considered difficult to extrude the ultra-high-molecular-weight polyethylene by itself because its melt viscosity is too high. In theory, however, the extrusion of the ultra-high-molecular-weight polyethylene may be presumed to be feasible by reducing its melt viscosity and impart fluidity to it. For that reason, a certain proposal has been made to improve inputting the resin into extruder screws by the addition of a low-molecular weight component such as polyethylene wax. With such a method, however, it is difficult to preset the conditions for obtaining the desired effect Nor can sheet- or film-like parts obtainable with such a method be put to practical use, since they contain cavities inevitably. Alternatively, the ultra-high-molecular-weight polyethylene may possibly be blended with general-purpose polyethylene. In this case, however, the excellent properties inherent in the ultra-high-molecular-weight polyethylene such as wear resistance and impact resistance would be lost, although, in some cases, a molecular weight reduction might be brought about depending upon the extruding conditions applied.

The present inventor has already found that high-molecular weight polyethylene, which is lower in molecular weight but more easily extruded and more relatively excellent in wear resistance than the ultra-high-molecular-weight polyethylene, is made composite with the ultra-high-molecular-weight polyethylene by the above dry blending to obtain a composite having a molecular weight of at least 1,000,000 and retaining the fluidity required for extrusion with the properties inherent in the ultra-high-molecular-weight polyethylene left intact, so that it can be extruded into a sheet-like part or piece.

By way of example, it is possible to obtain an ultra-high-molecular-weight polyethylene composite which has a molecular weight of about 1,800,000 and which can be extruded without causing damage to the properties of the ultra-high-molecular-weight polyethylene by mixing together 1 part of an ultra-high-molecular-weight polyethylene having a molecular weight of 2,900,000 and 1 part of a high-molecular weight polyethylene having a molecular weight of 950,000 by the procedures as mentioned above.

In what follows, reference will be made to an ultra-high-molecular-weight polyethylene composition comprising such a mixture system.

The ultra-high-molecular-weight polyethylene composition usable in the present invention is a composite comprising an ultra-high-molecular-weight polyethylene having, a viscosity-average molecular weight of 1,000,000 to 6,000,000 and a high-molecular weight polyolefin, having a viscosity-average molecular weight of 300,000 to 1,000,000, if required, together with the above inorganic materials, and having a viscosity-average molecular weight of between 300,000 and 2,000,000.

In order to produce the ultra-high-molecular-weight polyethylene composition, it is preferred that the ultra-high-molecular-weight polyethylene and high-molecular weight polyolefin be mixed together with the inorganic materials and that the resulting mixture be dry-blended by fast agitation in an inert gas atmosphere to obtain a composite.

The ultra-high-molecular-weight polyethylene used in the present invention may have a viscosity-average molecular weight of 1,000,000 to 6,000,000. For instance, preference is given to commercially available powdery products such as Hi-zex million 240M (trade name —made by Mitsui Petrochemical Industries, Ltd., with a molecular weight of 2,900,000) and Hosteren GUR412 (trade name—made by Hoechst Co., Ltd., West Germany, with a molecular weight of 2,400,000). Use may also be made of a synthesized polymer having a viscosity-average molecular weight of 1,000,000 to 6,000,000 the so-called crosslinked polyethylene that is crosslinked by crosslinkers or exposure to electron beams, and the like. In the present invention, the ultra-high-molecular-weight polyethylene should be as fine as 10 to 300 μm, preferably 50 to 200 μm in particle size in order to achieve as uniform mixing as possible.

As the high-molecular-weight polyolefin, use may be made of a high-molecular weight polyethylene having a vicosity-average molecular weight and/or a high-molecular weight polypropylene, both having a viscosity-average molecular weight of 300,000 to 1,000,000 and being able to be composited at 80° to 90° C. Such high-molecular-weight polyolefins, for instance, include commercially available products such as Lubmer L5000P (trade name made—by Mitsui Petrochemical Industries, Ltd., with a molecular weight of 950,000), Lubmer L3000P (trade name made—by Mitsui Petrochemical Industries, Ltd., with a molecular weight of 300,000) and Lu Polen 5261Z (trade name—made by BASF Co., Ltd., West Germany, with a molecular weight of 330,000). For use, such products should be made as fine as 10 to 300 μm, preferably 50 to 200 μm in particle size.

Since the viscosity-average molecular weight of the high-molecular weight polyolefin is less than 300,000, the composition according to the present invention decreases in strength and deteriorates in wear resistance, because the compatibility of the resins with each other worsens during molding.

The apparent molecular weight M of a mixture comprising the ultra-high-molecular-weight polyethylene with the high-molecular weight polyolefin is determined by the following equation:

M = n × (the viscosity-average molecular weight of the ultra-high-molecular-weight polyethylene) − (1 − n) × (the viscosity-average molecular weight of the high-molecular weight polyolefin)

wherein $0 < n < 1$.

In order to prepare the composition according to the present invention, the ultra-high-molecular-weight polyethylene and high-molecular weight polyolefin are mixed together into a composite, while n and their molecular weight are selected such that the apparent molecular weight of the resulting mixture is at least 1,000,000, desirously ranges from 1,200,000 to 2,000,000. The mixing ratio of the ultra-high-molecular-weight polyethylene to the high-molecular weight polyolefin is $1:(1-n)/n$, which can vary depending upon the desired moldability.

As the inorganic materials to be mixed with the polyolefin, use may be made of such single elements as already mentioned, for instance, carbon, gold, silver, aluminium, copper, chromium, nickel, iron, lead, molybdenum, zinc, tin, indium, bismuth, platinum, selenium, magnesium, manganese, cobalt, tungsten, titanium and germanium. Preference is given to electrically conductive elements such as carbon, silver, gold, aluminium, copper, iron, lead, zinc and nickel, which may be used alone or in combination of two or more in an amount of 0.1 to 20% by weight, and preferably 1 to 8% by weight. Such elements may have a particle size of 0.01 to 100 μm, and preferably 0.05 to 10 μm.

Heat-resistant materials, surfactants, colorants, lubricants, stabilizers and so on may additionally be incorporated.

In order to improve the heat resistance and rigidity, ceramics materials may further be mixed. The ceramic materials used may be those based on aluminium oxide, zirconia, calcium, silicone, silicon and the like or short fibers such as carbon fibers and Kepler fibers. Such materials are added in an amount of 0.1 to 20% by weight, preferably 1 to 10% by weight. The additives have a particle size of 0.01 to 100 μm, preferably 0.05 to 10 μm.

It is preferable to use fluorine base surfactants as the surface active agents. The fluorine base surfactants used may include anionic ones such as ammonium salts of perfluoroalkyl sulfonic acids, potassium salts of perfluoroalkyl sulfonic acids and potassium salts of perfluoroalkyl carboxylic acids; cationic ones such as iodides of perfluoroalkyl quaternary ammonium; and nonionic ones such as perfluoroalkyl polyoxyethylene ethanol and fluoroalkyl esters. They are all effective for improving the sliding properties with respect to polyester films that are magnetic tape materials. Among others, the anionic surfactants based on fluorine are most effective, probably because of the anionic, cationic and nonionic systems, the anionic ones are so low in the compatibility in polyethylene that they can bleed out onto the surfaces of molded pieces even in slight amounts. The fluorine base surfactants should be added in an amount of preferably 0.01 to 5% by weight, more preferably 0.1 to 1% by weight.

For their uniform dispersion at the time of mixing, it is desired that said fluorine base surfactants, either in powdery form or in viscous liquid form, be dissolved in and diluted to a low concentration with an organic solvent which can be evaporated off at relatively low temperatures and in which they are soluble such as, for instance, methanol, ethanol, isopropyl alcohol, acetone and methyl ethyl ketone. The resulting solution may further be atomized with a spray, etc. at the time of mixing for its uniform dispersion. Alternatively, finely divided powders of a fluorine resin such as polytetrafluoroethylene having a mean particle size of 5 to 20 μm may be added. Such fluorine resin powders are added in an amount of 0.1 to 30% by weight, preferably 5 to 25% by weight.

When the above polyolefin composition is formed into a tape pad for magnetic tapes, the addition of a hydrocarbonaceous oligomer having a number-average molecular weight of 400 to 4000, e.g., an ethylene-α-olefin oligomer is much more effective for improving the sliding properties. The amount of the hydrocarbonaceous oligomer added is in a range of 0.1 to 20% by weight, preferably 3 to 10% by weight.

Next, reference will be made to how to prepare the above composition.

For mixing together the ultra-high-molecular-weight polyethylene, high-molecular weight polyolefin and inorganic material with the additives added, if required, use may be made of a fast-agitating mixer such as a Henschel mixer. Such materials are then dry-blended together under the following agitating conditions; at a temperature from normal temperature to the softening point (80°–90° C.) of the high-molecular weight polyolefin in an atmosphere of an inert gas such as nitrogen gas and at a stirring speed of 10 to 10,000 rpm desirously 500 to 4,000 rpm for an agitating time of 10 to 30 minutes, and preferably 2 to 8 minutes. This object is to physically deposit the inorganic component onto the surface of powder particles, primarily the surface of the ultra-high-molecular-weight polyethylene. The thus mixed materials are considered to be well-dispersed, and are effective for preventing a lowering of the molecular weight of the substrate which may otherwise be caused by more intensive heating than required or shear stress with a screw so as to improve the dispersibility of the respective components in the barrel of a molding machine. It is noted that the above polyethylene stock may be applied to injection-molding.

Reference will now be made to how to extrude the feed polyethylene obtained as mentioned above into a sheet.

Added to the ultra-high-molecular-weight polyethylene composited as stated above is fluidity by its dry-blending with the high-molecular weight polyethylene. This composite, however, cannot be uniformly extruded with generally available screws or dies, because it is much higher in melt viscosity than various polyethylenes of commercial extruding grades.

The geometry of a screw lending itself well to extruding such a resin uniformly is defined in terms of an L/D of 20 to 40 and a compression ratio of 1.2 to 2.0. In order to increase the drag of the resin, it is desired that the flight be at an acute slope. More illustratively, it is desired that the inclination of the flight be in a range of 13.0° corresponding to a minimum flight pitch to 17.7° corresponding to a pitch equal to an ordinary screw diameter. The screw is divided into three zones, i.e., feed, compression and metering zones. It is to be noted here that the feed and compression zones are preferably longer than the metering zone. To put it in terms of the proportion of the number of flights in the feed, compression and metering zones, a ratio of about 5-8:7-8:4 is preferable. The results of experimentation have shown that stable sheets can be extruded at such a ratio.

In order to provide a promoted melting of the high-molecular weight component of the resin, it is desired that the metering zone be provided with a high shearing section. By way of example, the high shearing section may be of UCC fluted, ring barrier, mixed pin, Dulmage and double lead (spiral barrier) types. It is to be noted, however, that a high shearing section defined by providing a continuity of small gaps with respect to the wall surface of the cylinder is unsuitable for extruding the ultra-high-molecular-weight polyethylene, because reductions in the molecular weight and jamming of the resin take place. Experimentation has confirmed that the most preference is given to the provision of a double lead type of high shearing section in the metering zone.

Figure 1:
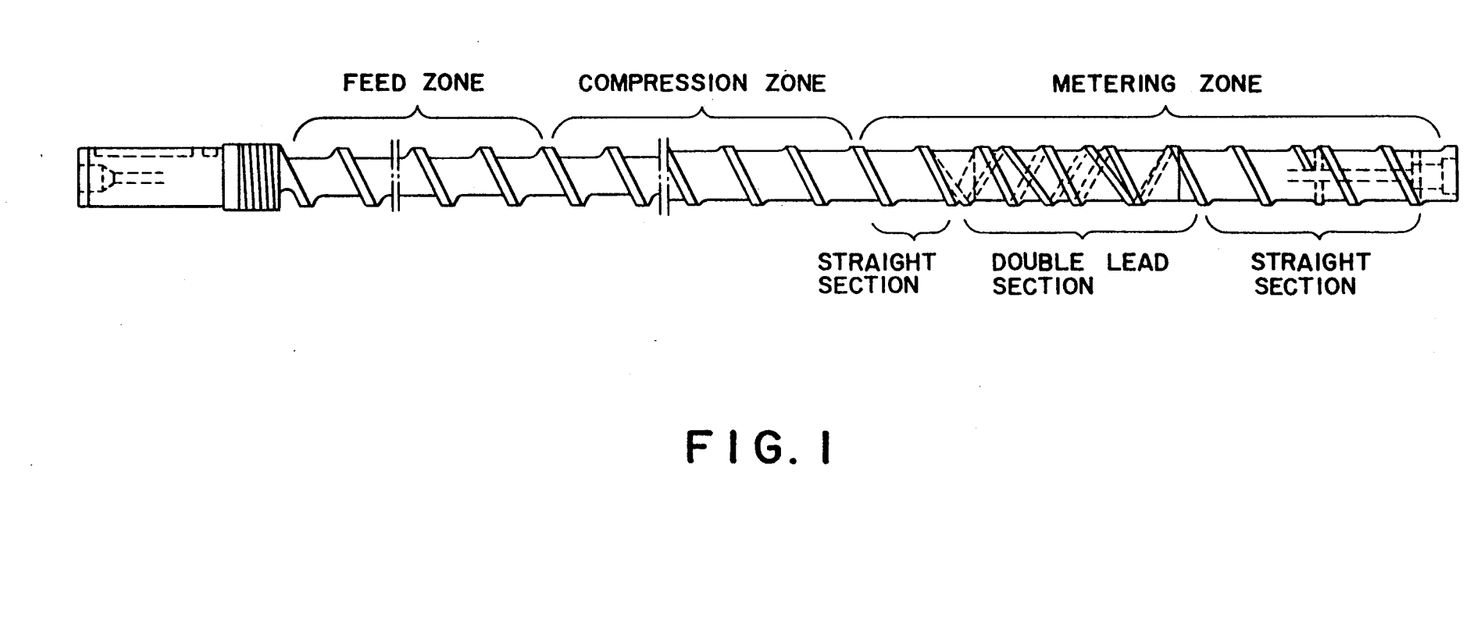
FIG. 1 is a schematic view of one embodiment of the screw of the extruder used for producing the polyethylene sheet according to the present invention.

One typical example of the screw designed on the basis of such a concept as mentioned above is schematically illustrated in FIG. 1, with the operating conditions set out in Table 1.

TABLE 1

| L/D: | 28 |
|---|---|
| Angle of inclination of flight: | 15.2° |
| Total number of flights: | 32 |
| Number of flights in the feed zone (F): | 10 |
| Number of flights in the compression zone (C): | 14 |
| Number of flights in the metering zone (M): | 8 |
| Number of flights in the straight section of M: | 2 |
| Number of flights in the double lead section (W) of M: | 4 |
| Number of flights in the straight section of M: | 2 |

Figure 2A:
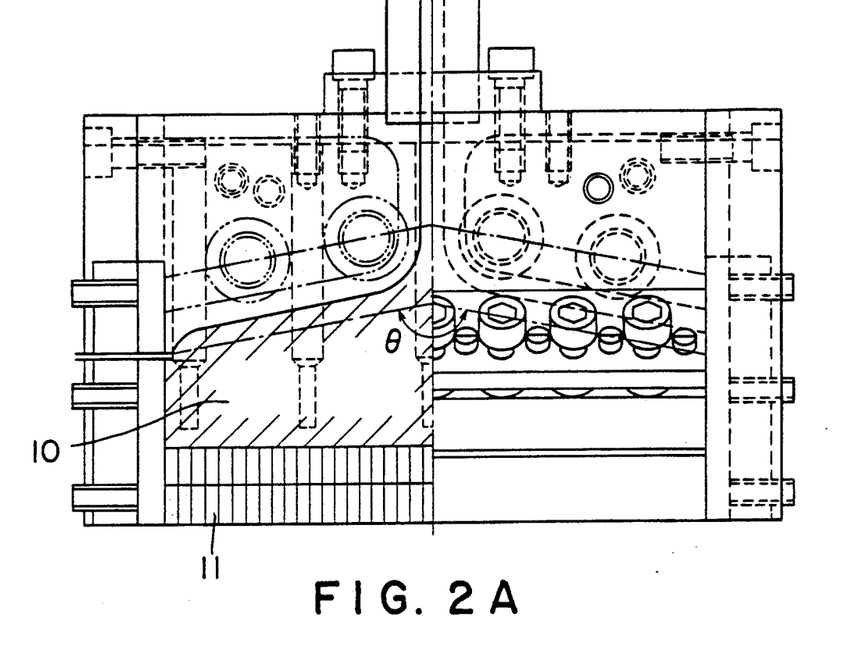
FIGS. 2A and 2B are sectional views showing one embodiment of the die of the extruder, FIGS. 3A, 3B, 3C, 3D and 3E as well as FIG. 4A are views showing the geometries of tape pads.
Figure 2B:
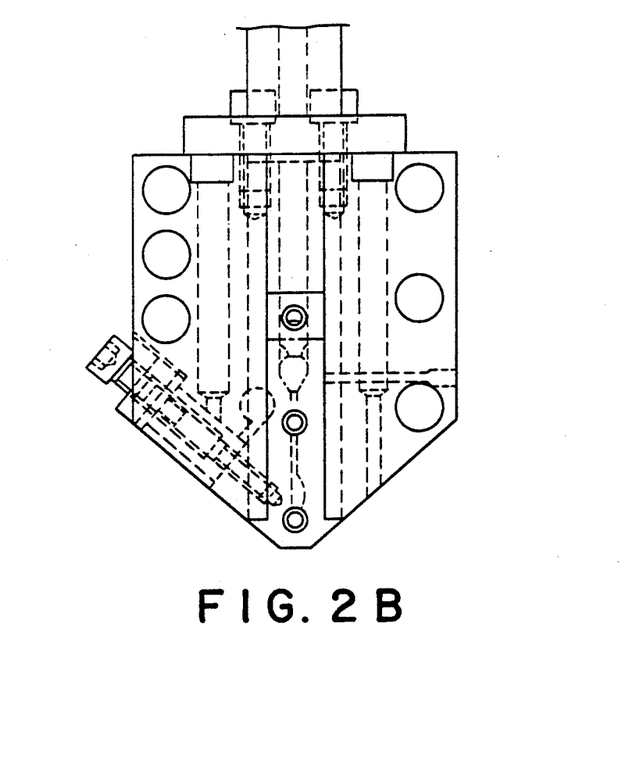
Figure 3A:
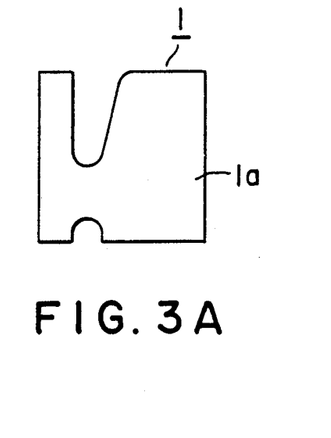
Figure 3B:
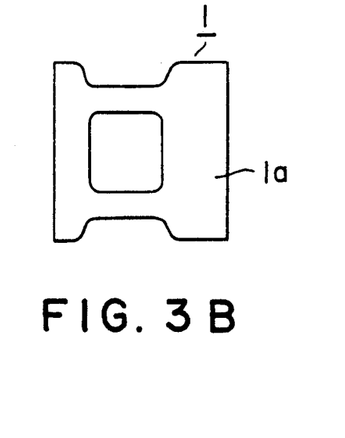
Figure 3C:
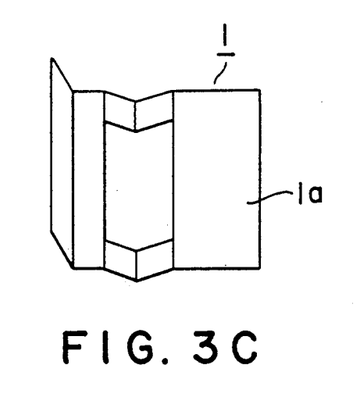
Figure 3D:
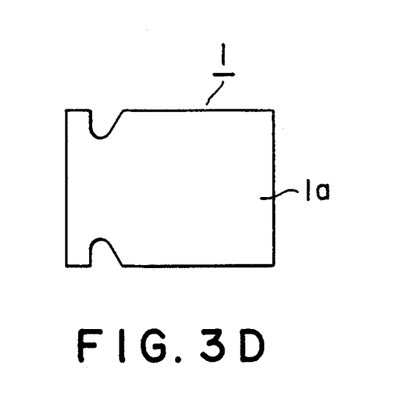
Figure 3E:
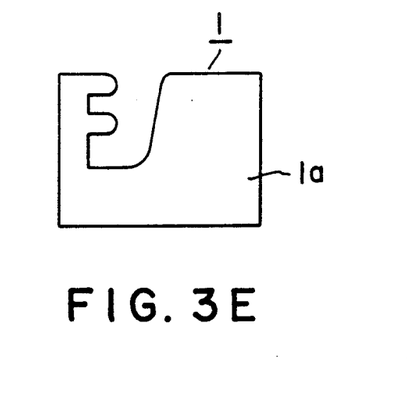

Reference will now be made to the die for ultra-high-molecular-weight polyethylene. The melt viscosity of the composite ultra-high-molecular-weight polyethylene is lower than that of ordinary ultra-high-molecular-weight polyethylene, but higher than that of general-purpose polyethylene such as high-density or low-density polyethylene by a factor of 10 or more. It is therefore impossible to extrude the resin uniformly, using a die of such a design as used for general-purpose polyethylene. For this reason, it is desired that the die include a deep resin-flowing surface and a coathanger section having its angle of aperture regulated to optimum, say, 120° to 170°. In order to obtain sheets of 140 to 250 μm in thickness, it is also desired that a bending lip be used as the die lip to rid the resin-flowing surface of useless irregularities. One typical die designed on the basis of such a concept as mentioned above is illustrated in FIGS. 2A and 2B, in which reference numeral 10 stands for a resin-flowing surface, 11 a die lip and $\theta$ an angle of aperture of the coathanger.

The molding or extruding conditions will now be explained.

Due to its much higher melt viscosity, the ultra-high-molecular-weight polyethylene should preferably be molded at a molding temperature higher than applied to ordinary polyethylene, thereby decreasing its viscosity. However, a certain upper limit is placed upon the molding temperature, since the higher the molding temperature, the more likely that the molecular chain of the polyethylene will be severed. Additionally, it is desired that an inert gas, e.g., nitrogen ga, is fed to a hopper of an extruding machine to avoid as much oxidation of the resin as possible and thereby prevent the molecular weight from being reduced. The range of the molding conditions is set out in Table 2.

TABLE 2

| Molding conditions | |
|---|---|
| Cylinder Temperature | |
| Feed Zone | 70-220° C. |
| Compression Zone | 200-260° C. |
| Metering Zone | 210-280° C. |
| Die Temperature | 230-300° C. |
| Roller Temperature | 40-90° C. |
| Revolutions per min. of Screw | 10-120 rpm |

The temperature of the feed zone is to be selected from a wide temperature range for the following reason. If the inputting of the resin to the screw becomes unsatisfactory, then it is stabilized by supplying the resin at a temperature lower than its melting point, at which it remains unmelted and powdery, from the feed zone to the compression zone. If the feeding of the resin to the screw is satisfactory, the feed zone then need not be brought down to lower temperature. With such a resin, extruding equipment and molding conditions as mentioned above, the composite ultra-high-molecular-weight polyethylene can be extruded into a sheet.

The structure of the roll unit used for extrusion will now be explained.

In general, it is very difficult to form thin-walled products of a high-molecular weight polyethylene having a molecular weight of at least 300,000 esp., at least 800,000 or an ultra-high-molecular-weight polyethylene, partly because they have a high melt viscosity, partly because of the phenomenon of die swelling—a phenomenon in which the resin thickens instantaneously upon leaving the die—occurs when the resin is discharged out of the die, and partly because unmelted gels exist.

Figure 5:
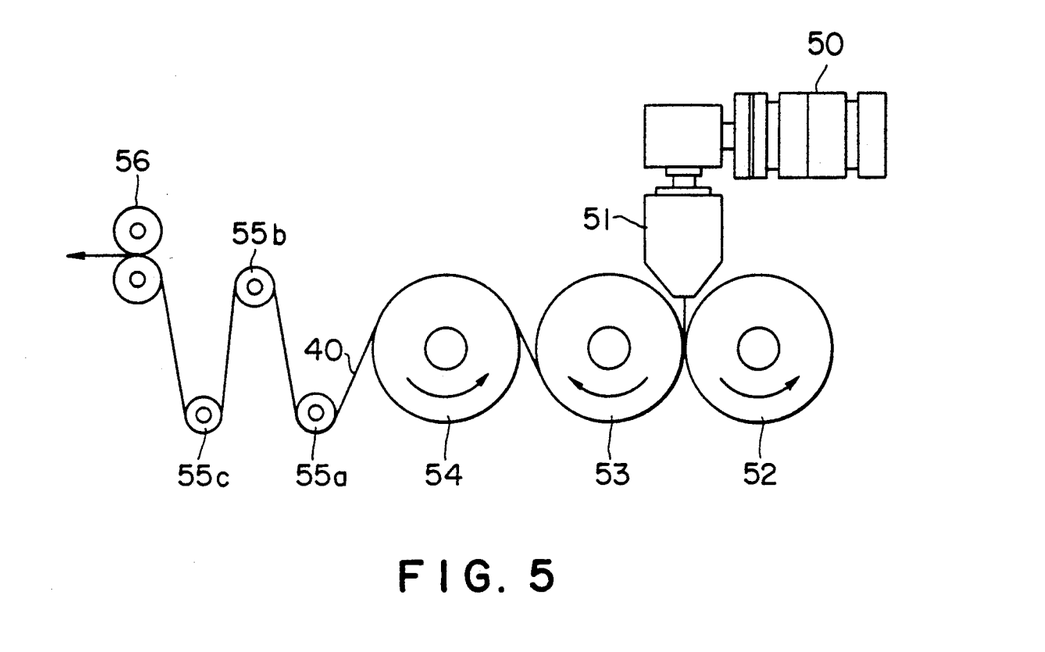
FIG. 5 is a schematic view illustrating an arrangement of the extruder and roll unit.

The present inventors have already found that the above problem can be overcome by making specific modifications to the conditions for operating the roll unit. A typical arrangement of an extruding system is illustrated in FIG. 5. Upon extrusion out of a die zone 51 of extruding equipment 50, a sheet 40 is carried by first, second and third rolls 52, 53 and 54 and is drawn by a take-off unit 56 through cooling rolls 55a, 55b and 55c. In order to obtain a sheet-like product having a specific thickness of 100 to 300 μm, the roll temperature is preset at 60° to 120° C., preferably 65° to 95° C. in the present invention.

Turning again to the arrangement of FIG. 5, the sheet is preferably pressed between the first and second rolls 52 and 53 at a linear pressure of 40 to 90 kgf/cm². It is also desired that the die be located as closely to the first roll 52 as possible, i.e., with the space of at most 50 μm between them. This ensures that upon being discharged with some thickness, the resin is so crushed that the resin particles can be well brought into close contact with one another.

In the present invention, the sheet is preferably drawn in its flowing direction while pressed between the first and second rolls, thereby stretching it uniaxially. This uniaxial stretching causes the molecules to be orientated, resulting in an increase in the strength of the sheet in its flowing direction.

Used for such operations as mentioned above is a roll unit including a hydraulic unit capable of producing a linear pressure on the order of 100 kgf/cm², metal rolls of high rigidity, which can withstand such a linear pressure and is of an eccentric precision of 10 μm or lower, and a high-torque take-off motor for stretching.

The surface roughness of the polyethylene sheet according to the present invention will now be explained.

When the sheet of the present invention is to be applied as a tape pad, it is essentially important to place the surface roughness of the sliding surface of the tape pad under strict control in order to keep it from marring the back side of a magnetic tape, when contacting that. According to the present inventor's finding, the average surface roughness Ra and the maximum surface roughness Rmax should preferably be limited to the following ranges, respectively.

0.1 μm ≦ Ra ≦ 2 μm 1.0 μm ≦ Rmax ≦ 10 μm

In the present invention, the surface roughness of the sheet may also be adjusted by making any desired modification to the surface roughness of such rolls as mentioned above.

If a pair of rolls for pressing a sheet extruded out of a screw extruder are preset at different temperatures, it is then possible to curl one side of the extruded sheet to any desired state. The degree of curling may be selected depending upon the geometry of the end tape pad.

Reference will now be made to how to process the composite ultra-high-molecular-weight polyethylene sheet molded by the present invention into a tape pad.

Possible procedures of the end-face-R-profiling required for tape pads are profile extrusion and post-profiling, i.e., slit-profiling. However, profile extrusion, which should take care of dimensional accuracy, cannot be applied to the present invention which makes use of the ultra-high-molecular-weight polyethylene having much higher melt viscosity. Thus, post-end-face-R-profiling has been studied.

A sheet of the composite ultra-high-molecular-weight polyethylene as described in the foregoing is slit to the required width by the following four techniques
1) Heating technique
   The sheet is slit through a heat-generating wire such as an electric heating wire or melted and rounded off by heat.
2) Laser technique
   The sheet is slit by a laser beam.
3) Water jet technique
   The sheet is slit by a high-speed and high-pressure water jet.
4) Cutter technique
   The cutters used are generally known and include:
   i) Rotary shear cutter,
   ii) Gang cutter, and
   iii) Leather cutter.

The first heating technique is effective for sheets of low-molecular weight and low-viscosity materials, but is found to be unsuitable for the sheet of the ultra-high-molecular-weight polyethylene. This is because, owing to its much higher melt viscosity, the ultra-high-molecular-weight polyethylene sheet is rounded off or sphered on its end faces, or thicken at its ends or undulate along the slits.

Problems with the second laser technique, which has the advantage of being a dry process, are that waste gases are produced, the cut surfaces sag, and the cost involved is high, etc. This, the laser technique is found to benefit for the present invention.

The third water jet technique does not lend itself to the present invention by reason that it is a wet process and because of the problem that the sheet is so twisted by water pressure for lack of thickness that no dimensional accuracy can be obtained, as well as other problems. This technique also requires post-treatment to remove water.

The fourth cutter technique is not suited for processing material into sliding members, since the end faces of the resulting slits are at angles so acute that they can mar tapes.

As a result of studies made of a variety of such slitting techniques, the present inventor has now found that ultra-high-molecular-weight polyethylene sheets can be precisely and effectively rounded off at their end faces by a technique using a score cutter. With the score cutter technique, it is possible to plastically deform end faces in their thickness direction and so round off them in a satisfactory state. This appears to be due to the fact that, unlike other techniques, the score cutter technique makes use of force-cutting.

Figure 6A:
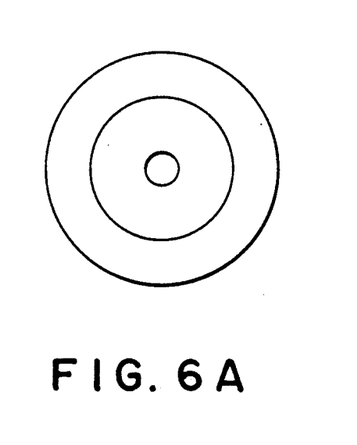
FIGS. 6A and 6B are views showing the shape of a score cutter.
Figure 6B:
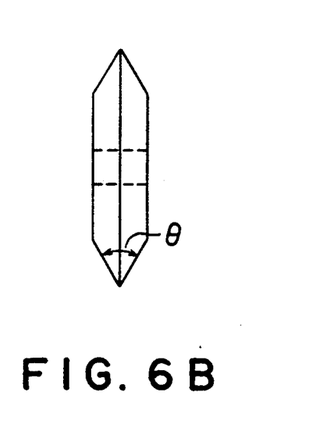

FIGS. 6A and 6B are front and cross-sectional view of such a score cutter. For slitting, this cutter is forced directly against the surface of a raw sheet-feeding rotary roll of a slitter. Preferably, the angle of the edge of the cutter blade is 20° to 90°, more particularly 45° to 60°.

In using this score cutter, it is desired to take account of the hardness of the roll. For instance, if the score cutter is formed of tool steel and the roll of bearing steel and ceramics, it is then possible to not only extend the service life of the cutter but also to improve the curved surface geometry of the end face of a sheet. Conversely it is unpreferred to form the blade of the score cutter of a material harder than the roll, since the roll is much more damaged and the abrasion of the roll is more promoted. Ideally, it is desired that the roller be formed of hard material, e.g., ceramics or a hardened metal and the cutter from a material not so hard as it. According to the above technique, it is essentially required that slitting be carried out at normal temperature or in the absence of heat.

Figure 7:
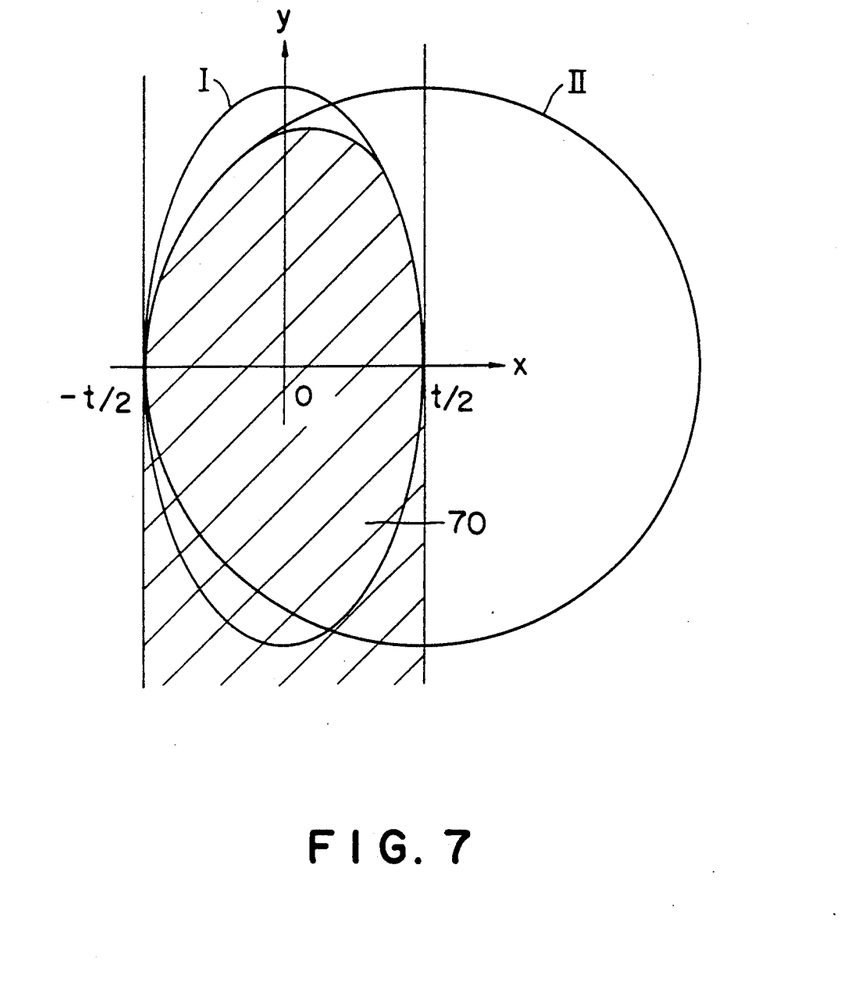
FIG. 7 is a view illustrative of the geometry of the end face of a sheet slit by the score cutter.

A typical geometry of the end face of the product slit by the above technique is shown in FIG. 7 and meets the following conditions.

That is, the following formulae I and II hold.

$$x^2/(t/2)^2 + y^2/l^1 \leq 1 \quad (I)$$

$$(x-t/2)^2/t^2 + y^2/l^2 \leq 1 \quad (II)$$

wherein l stands for the widthwise length.

The end face obtained by the above technique is defined by Formula I wherein y 0, or alternatively assumes a common plane lying within ellipses expressed by Formulae I and II wherein y 0. Then, the range defined by the widthwise length l is:

$$t/4 \leq l \leq 1.5t$$

esp., $t/2 \leq l \leq t$.

By subjecting tape-like raw sheets slit by the above score cutter to embossing, thinning, bending or other processings, if required, it is possible to inexpensively and simply produce tape pads which are much more improved in frictional resistance than are conventional tape pads comprising PET and much more improved in properties than tape pads in which ultra-high-molecular-weight polyethylene is bonded to PET.

For ½-inch wide tapes, by way of example, the tape pads have a thickness of 100 to 300 μm, preferably 150 to 200 μm, a length of 10 to 30 mm, preferably 15 to 24 mm and a width of 12.7 to 16 mm, preferably 14.5 to 15.2 mm. The tape pads may also be thinned, bent or embossed into the desired geometries, following the required tension. Some preferable examples are illustrated in FIGS. 3A to 3E, in which 1a stands for portions over which magnetic tapes are to slide.

The tape pads obtained by the above techniques are advantageous over conventional tape pads in the following points.

(A) The theory of tribology teaches that conventional tape pads consisting solely of PET mar magnetic surfaces. However, the tape pads of polyethylene are so good that in theory, they cannot possibly mar tape surfaces.

(B) Tape pads, in which ultra-high-molecular-weight polyethylene or Teflon (PTFE) is applied PET films, are satisfactory in point (A), but they take so much time to process that they are less than unsatisfactory in terms of mass production and cost. However, the present invention, characterized in that the polyethylene sheets according to the present invention can be punched out into products in simple manner, is much more advantageous over conventional techniques in terms of mass production and cost.

(C) The steps involved can be reduced, since end-face-R-profiling occurs simultaneously with slitting.

(D) Since the products of the present invention are provided as integral parts, there is no fear at all that the ultra-high-molecular-weight polyethylene may peel off PET films, as experienced with tape pads in which the ultra-high-molecular-weight polyethylene is applied to PET films, as mentioned in (B). The present products have also improved stability-with-time, since the ultra-high-molecular-weight polyethylene per se has the property of excelling in chemical resistance and so is a material very stable with respect to environmental changes.

The present invention will now be explained in greater detail with reference to examples of production.

EXAMPLE 1

Using a Henschel mixer, 50 parts by weight of an ultra-high-molecular-weight polyethylene having a molecular weight of 3,500,000 and 50 parts by weight of a high-molecular weight polyethylene having a molecular weight of 900,000 were dry-blended by high-speed agitation together with carbon black in an amount of 5 parts by weight based on the total weight of these polymers at 80° C. for 5 minutes in a nitrogen atmosphere, thereby obtaining a composite ultra-high-molecular-weight polyethylene found to have a molecular weight of about 2,200,000.

Using a single-screw extruder including a screw of φ45, having an L/D ratio of 30 and a compression ratio of 2.0 and divided into a feed zone having 10 flights, a compression zone having 14 flights and a metering zone having 8 flights, 32 flights in all, said metering zone being provided with a double lead type of high shearing section, the above resin was extruded into a sheet under the following conditions:

Feed zone temperature: 70° C.
Compression zone temperature: 200° C.,
Metering zone temperature: 250° C.,
Die temperature: 270° C.,
Roller temperature: 60° C.,
Screw: 50 rpm,
Die lip gap: 150 μm, and
Take-off speed: 15 m/min.

After extrusion, the extruded product was found to have a molecular weight of about 2,000,000.

EXAMPLE 2

One hundred (100) parts by weight of an ultra-high-molecular-weight polyethylene having a molecular weight of 1,500,000 were dry-blended with 5 parts by weight of carbon black into a composite ultra-high-molecular-weight polyethylene, which was in turn extruded in similar manners as in Example 1. After extrusion, the product was found to have a molecular weight of about 1,400,000.

EXAMPLE 3

Fifty (50) parts by weight of an ultra-high-molecular-weight polyethylene having a molecular weight of about 1,800,000 and 50 parts by weight of a high-molecular weight polyethylene having a molecular weight of 300,000 were dry-blended together with carbon black in an amount of 5 parts by weight based on the total weight of the polymers into a composite ultra-high-molecular-weight polyethylene having a molecular weight of about 100,000, which was then extruded in similar manners as in Example 1. After extrusion, the product was found to have a molecular weight of about 900,000.

Figure 4A:
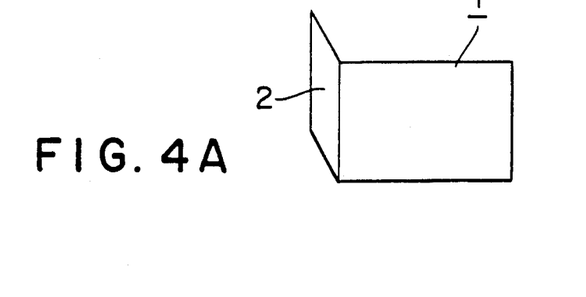
Figure 4B:
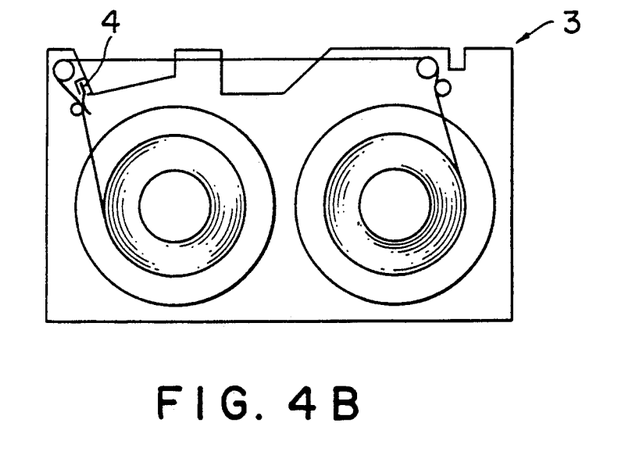
FIG. 4B is a view illustrating part of a video tape cassette.
Figure 4C:
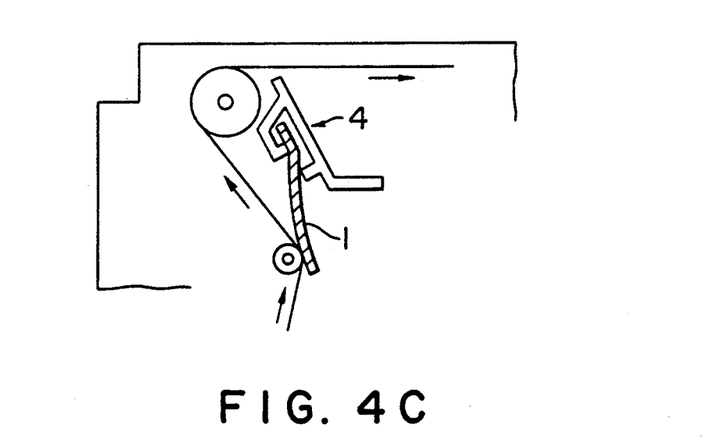
FIG. 4C is an enlarged view of a portion of the above video tape cassette to which a tape pad is attached.

As a result, sheets of 160 μm in thickness were obtained throughout Examples 1, 2 and 3. The obtained sheets were free from any thickness variation and had a fine appearance. Each sheet was slitted to a width of 23.2 mm with a slitter equipped with a score cutter, thereby obtaining a tape-like sheet. Slit by the score cutter, this tape-like sheet was rounded off at both its ends. This sheet was cut to a length of 15 mm, thereby obtaining a small strip piece. As illustrated in FIG. 4A, the strip piece generally shown at 1 is bent at 5 mm spaced away from its one end, as viewed longitudinally, thereby forming a bend 2 to be attached in place in a video cassette body. As illustrated in FIGS. 4B and 4C, the thus prepared tape pad 1 was attached to a given position in a video cassette body 3 for tape traveling testing.

The tape traveling testing was carried out by repeating a hundred times a cycle of tape playback, fast feeding and rewinding in an atmosphere of $-5°$ C. and then repeating a similar cycle a further 100 times in an atmosphere of 40° C. and 90% RH. For estimation, the number of dropouts more than 20 dB and 15 $\mu s$ was thereafter counted. The results were equivalent to those of similar testing performed using a conventional tape pad as a blank, indicating that no adverse influence is produced on recorded signals.

Observation of the magnetic tape surface under a microscope has indicated that there was no surface injury. Furthermore, the video cassette body was dismantled after testing to observe the interior of the housing. As a result, such matter as abrasion powder was not found at all. Nor did the tape pad show any sign of abrasion or weight loss.

Additionally, 24-hour vibration testing was performed at a frequency of 10 to 200 Hz with a video tape to which the instant tape pad was attached. As a result, it was confirmed that the video tape did not sag at any frequency, indicating that the tape pad fulfilled its own function.

As will be appreciated from the above results, the instant tape pad is cheaper than conventional tape pads, but is equal or superior in performance to them, offering no problem in connection with its properties.

EXAMPLE 4

(Molecular weight: 900,000)

Using a Henschel mixer, 100 parts by weight of a high-molecular weight polyethylene having a molecular weight of 900,000 (Lubmer L-5000P manufactured by Mitsui Petrochemical Industries, Ltd.) were dry-blended by high-speed agitation with 5 parts by weight of carbon black (#33, manufactured by Mitsui Chemical Industries, Ltd.) at 80° C. for 5 minutes in a nitrogen atmosphere, thereby obtaining a composite high-molecular weight polyethylene.

Using a single-screw extruder including a screw of 45, having an L/D ratio of 30 and a compression ratio of 2.0 and divided into a feed zone having 10 flights, a compression zone having 14 flights and a metering zone having 8 flights, 32 flights in all, said metering zone being provided with a double lead type of high shearing section, the above resin was extruded into a sheet under the following conditions:

Feed zone temperature: 220° C.,
Cooling roller temperature: 75° C.,
Screw: 50 rpm,
Die lip gap: 150 $\mu m$,
Metal rollers: a surface roughness of 0.5 x,
Roll pressure: 70 $kg/cm^2$,
Roll speed of rotation: 4.0 m/min., and
Take-off speed: 5 m/min.

EXAMPLE 5

(Molecular weight: 1,500,000)

Using a Henschel mixer, 100 parts by weight of a high-molecular weight polyethylene having a molecular weight of 900,000 (Lubmer L-5000P manufactured by Mitsui Petrochemical Industries, Ltd.) were dry-blended by high-speed agitation with 100 parts by weight of an ultra-high-molecular-weight polyethylene having a molecular weight of 2,900,000 (Hi-zex million 240M manufactured by Mitsui Petrochemical Industries, Ltd.) and 10 parts by weight of carbon black (#33, manufactured by Mitsui Chemical Industries, Ltd.) at 80° C. for 5 minutes in a nitrogen atmosphere, thereby obtaining a composite high-molecular weight polyethylene.

The thus obtained composite ultra-high-molecular-weight polyethylene was found to have a molecular weight of about 1,500,000.

The above resin was extruded in similar manner as above (in Ex. 1).

The sheets obtained in Examples 4 and 5 both had a thickness of 180 $\mu m$. They were kept free from any thickness variation and cavity and had a nice appearance.

The physical properties of the sheets are set out in the following table.

TABLE

| Physical properties of sheets | |
| --- | --- |
| Physical properties | Measurements |
| Thickness | 180 5 ($\mu m$) |
| Tensile strength (in the flowing direction) | 520 ($kg/cm^2$) |
| Tensile strength (in the widthwise direction) | 350 ($kg/cm^2$) |

The thickness was measured at an arbitrarily selected 100 points, and the tensile strength in each direction was determined by punching out a test piece at 20 points in the form of a 6 mm wide dumbbell according to ASTM standards.

EXAMPLE 6

Molecular weight: 2,220,000)

Using a Henschel mixer, 100 parts by weight of a high-molecular weight polyethylene having a molecular weight of 900,000 (Lubmer L-5000P manufactured by Mitsui Petrochemical Industries, Ltd.) were dry-blended by high-speed agitation with 200 parts by weight of an ultra-high-molecular-weight polyethylene having a molecular weight of 2,900,000 (Hi-zex million 240M manufactured by Mitsui Petrochemical Industries, Ltd.) and 15 parts by weight of carbon black (#33, manufactured by Mitsui Chemical Industries, Ltd.) at 80° C. for 5 minutes in a nitrogen atmosphere, thereby obtaining a composite high-molecular weight polyethylene.

The thus obtained composite ultra-high-molecular-weight polyethylene was found to have a molecular weight of about 2,200,000.

The above resin was extruded in a similar manner as above (in Ex. 4).

As a result, a sheet of 180 $\mu m$ in thickness was obtained. However, this sheet was in no sense a commercial one, since it varied largely in thickness and had a number of cavities and surface irregularities.

EXAMPLE 7

(100 $\mu m$ thick sheet having a molecular weight of 900,000)

Using a single-screw extruder including a screw of φ45, having an L/D ratio of 30 and a compression ratio of 2.0 and divided into a feed zone having 10 flights, a compression zone having 14 flights and a metering zone having 8 flights, 32 flights in all, said metering zone being provided with a double lead type of high shearing section, the above resin was uniaxially stretched and extruded into a sheet under the following conditions:

Feed zone temperature: 240° C.,
Cooling roll temperature: 100° C.,
Screw: 50 rpm,
Die lip gap: 100 μm,
Metal rolls: a surface roughness of 0.5 s,
Roll pressure: 90 kg/cm$^2$,
Roll speed of rotation: 8.0 m/min, and
Take-off speed: 11 m/min.

EXAMPLE 8

(100 μm, molecular weight—of a mixed system—of 1,500,000)

Using a Henschel mixer, 100 parts by weight of a high-molecular weight polyethylene having a molecular weight of 900,000 (Lubmer L-5000P manufactured by Mitsui Petrochemical Industries, Ltd.) were dry-blended by high-speed agitation with 100 parts by weight of an ultra-high-molecular-weight polyethylene having a molecular weight of 2,900,000 (Hi-zex million 240M manufactured by Mitsui Petrochemical Industries, Ltd.) and 10 parts by weight of carbon black (#33, manufactured by Mitsui Chemical Industries, Ltd.) at 80° C. for 5 minutes in a nitrogen atmosphere, thereby obtaining a composite high-molecular weight polyethylene.

The thus obtained composite ultra-high-molecular-weight polyethylene was found to have a molecular weight of about 1,500,000.

The above resin was extruded in a similar manner (as in Ex. 7).

In both Examples 7 and 8, sheets of 100 μm in thickness were obtained by uniaxial stretching in the flowing direction. They were free from either thickness variations or cavities and had a fine appearance. The physical properties of the sheets are set out in the following table.

TABLE

| Physical properties of sheets | |
|---|---|
| Physical properties | (Averaged) measurements |
| Thickness | 100 8 (μm) |
| Tensile strength (in the flowing direction) | 650 (kg/cm$^2$) |
| Tensile strength (in the widthwise direction) | 330 (kg/cm$^2$) |

As can be seen from the above table, the value of the tensile strength in the flowing direction is larger than that of Ex. 4, indicating that some effect is gained by uniaxial stretching.

EXAMPLE 9

(Use of embossing roll)

Under similar conditions as in Ex. 4, extrusion was effected with metal rolls, whose matt-finished surfaces had a surface roughness Ra of 20 μm.

As a result, a matt-like sheet having a surface roughness Ra of 16 μm was obtained.

EXAMPLE 10

(Determination of the direction of curling)

Extrusion was effected under similar conditions as in Ex. 4, provided that the temperatures of the cooling rollers were preset at 70° C. for the first roll, 75° C. for the second roll and 70° C. for the third roll.

EXAMPLE 11

Extrusion was effected under similar conditions as in Ex. 4, provided that the temperatures of the cooling rolls were preset at 70° C. for the first roll, 70° C. for the second roll and 70° C. for the third roll.

EXAMPLE 12

Extrusion was effected under similar conditions as in Ex. 4, provided that the temperatures of the cooling rolls were preset at 70° C. for the first roll, 65° C. for the second roll and 70° C. for the third roll.

The directions of curling of the sheets obtained in Examples 10, 11 and 12 are summarized in the following table.

TABLE

| Directions of curling | | |
|---|---|---|
| | Directions of curling | Found |
| Ex. 10 | Curling occurred on the back side of the sheet | +0.4 (mm/20 mm) |
| Ex. 11 | No or little curling occurred. | +0.1 (mm/20 mm) |
| Ex. 12 | Curling occurred on the front side of the sheet | −0.3 (mm/20 mm) |

As will be seen from the results as set out above, the directions of curling of sheets can be determined by varying the temperature of the second roll.

EXAMPLE 13

The sheet obtained in Ex. 4 was slit to a width of 15.0 mm by a slitter provided with a score cutter.

EXAMPLE 14

The sheet obtained in Ex. 4 was slit to a width of 15.0 mm by a slitter provided with a gang cutter.

EXAMPLE 15

The sheet obtained in Ex. 4 was slit to a width of 15.0 mm by a slitter provided with a feather cutter.

EXAMPLE 16

The sheet obtained in Ex. 4 was slit to a width of 15.0 mm by a slitter provided with a hot wire cutter.

Set out below are the results of the width accuracy and face shapes of the slits formed by the above four techniques.

TABLE

| | | Results of slitting | |
|---|---|---|---|
| Examples | Slitting means | Width accuracy | End face shapes |
| 13 | Score cutter | 15.0 0.05 mm | Curved shape (about 0.15 R) |
| 14 | Gang cutter | 15.0 0.05 mm | No curved shape |
| 15 | Feather cutter | 15.0 0.08 mm | No curved shape |
| 16 | Hot wire | 15.0 0.15 mm | Curved shape |

TABLE-continued

| | Results of slitting | | |
|---|---|---|---|
| Examples | Slitting means | Width accuracy | End face shapes |
| | cutter | | (about 2 R)* |

*: With the hot wire cutter of Comparative Ex. 6, the thickness of the end face was reduced to 500 μm due to thermal shrinkage.

From the results set out above, it has been found that the hot wire cutter of Ex. 16 imparts an R shape to the end face but gains no thickness and width accuracy, and the cutters of Examples 14 and 15 gain some width accuracy but fail to impart any curved shape to the end faces.

It thus evident that the score cutter lends itself well to achieving curved end faces and improved slit accuracy.

EXAMPLE 17

The sheet of Ex. 4 was slit by the technique of Ex. 12 and punched out in the form of a tape pad.

EXAMPLE 18

The sheet of Ex. 5 was slit by the technique of Ex. 13 and punched out in the form of a tape pad.

EXAMPLE 19

A 180 μm thick sheet of a high-density polyethylene having a molecular weight of 200,000 was slit by the technique of Example 13 and punched out in the form of a tape pad.

EXAMPLE 20

A 180 μm thick sheet of an ultra-high-molecular-weight polyethylene having a molecular weight of 2,500,000 was slit by the technique of Ex. 13 and punched out in the form of a tape pad.

Set out below are the properties of the thus punched-out tape pads.

TABLE

| | Estimation of tape pads | | |
|---|---|---|---|
| | Stiffness | Bruises on tape pads | Bruises on the back sides of tapes |
| Ex. 17 | 2.0-2.6 (g) | Not found | 1-3 |
| Ex. 18 | 2.2-2.8 (g) | Not found | 2-4 |
| Ex. 19 | 1.5-1.9 (g) | Found (scratches) | 2-5 |
| Ex. 20 | 1.8-2.2 (g) | Not found | 10-13 |

For the estimation of stiffness, a slit sheet sample of 15 mm in width was cut out to a length of 10 cm, rounded off and displaced 1 mm. One minute later, the load of the sample was compared with its original load.

Estimation of bruises was made by attaching each tape pad to a video tape and repeating a cycle of fast feeding and rewinding 300 times. Thereafter, the number of bruises on the tape pads and the back sides of the tapes were counted.

As can be seen from the above results, the high-density polyethylene sheet is of low stiffness and the tape pad obtained from it is likely to be bruised. The sliced sheet having a molecular weight of 2,500,000 is of somewhat low stiffness because of being not stretched in the flowing direction, and is likely to cause much more damage to the back sides of tapes.

From the above results, turns out that the extruded sheets of ultra-high-molecular-weight polyethylene are a very excellent material for tape pads.

INDUSTRIAL APPLICABILITY

The ultra-high-molecular-weight polyethylene sheets of the present invention may be widely used as sliding members in thin-sheet or sheet-like forms such as tape pads used as a part of magnetic tape cassettes and slip sheets for floppy disks.

We claim:

1. A non-porous ultra-high-molecular-weight polyethylene sheet comprising a non-porous sheet having a thickness of 100 to 300 microns formed by extruding in the absence of plasticizer a feed polyethylene comprising a mixture of at least two polyethylenes selected from a polyethylene having a viscosity-average molecular weight of 300,000 to 1,000,000 and a polyethylene having a viscosity-average molecular weight of 1,000,000 to 6,000,000, the mixture having a viscosity-average molecular weight of 300,000 to 2,000,000.

2. The non-porous ultra-high-molecular-weight polyethylene sheet of claim 1, wherein the feed polyethylene is extruded from a screw extruder at a discharge angle of 120° to 170°.

3. A sheet as claimed in claim 1, wherein said feed polyethylene has a viscosity-average molecular weight of 800,000 to 1,500,000.

4. A sheet as claimed in claim 1, wherein said feed polyethylene further includes an inorganic material.

5. A sheet as, claimed in claim 1, which has a fine pattern on its surface.

6. A method for making a non-porous ultra-high-molecular-weight polyethylene sheet comprising
   screw extruding in the absence of plasticizer a feed polyethylene comprising a mixture of at least two polyethylenes selected from a polyethylene having a viscosity-average molecular weight of 300,000 to 1,000,000 and a polyethylene having a viscosity average molecular weight of 1,000,000 to 6,000,000, the mixture having a viscosity-average molecular weight of 300,000 to 2,000,000,
   discharging the extruded feed polyethylene mixture at a discharge angle of 120° to 170° to form a discharged polyethylene sheet, and
   roll pressing the discharged polyethylene sheet between a pair of heated rolls while uniaxially stretching the sheet in the extruding direction of the sheet to form a non-porous ultra-high-molecular-weight polyethylene sheet having a thickness of 100 to 300 microns.

7. The method of claim 6, wherein roll pressing is carried out between a pair of rolls, each roll of the pair being heated at a different temperature and the difference in the temperatures is no more than 5° C.

8. A method as claimed in claim 6, wherein said feed polyethylene further includes an inorganic material.

9. A method as claimed in claim 6, wherein said feed polyethylene is extruded into a sheet form, while it is uniaxially stretched in the extruding (flowing) direction of said sheet.

10. A method as claimed in claim 6, wherein the extrusion occurs at a compression ratio of 1.2 to 2.0.

11. A method as claimed in claim 6, wherein each of said rolls has a fine convex and concavity pattern on its surface.

12. A sliding member comprising an ultra-high-molecular-weight-polyethylene, characterized in that it is obtained by forming an ultra-high-molecular-weight polyethylene as claimed in claim 1 into a given shape.

13. A tape pad for magnetic tapes comprising an ultra-high-molecular-weight polyethylene, characterized in that it is obtained by forming an ultra-high-molecular-weight polyethylene as claimed claim 1 into a given shape.

14. A tape pad as claimed in claim 13, wherein said ultra-high-molecular-weight polyethylene sheet has a curved surface.

15. A tape pad as claimed in claim 13, wherein in forming said ultra-high-molecular-weight polyethylene sheet into a given shape, said sheet is slit into the given shape by a score cutter in the absence of heat.

16. A tape pad as claimed in claim 15, wherein the angle of the edge of the blade of said score cutter is in a range of 20° to 90°.

17. A tape pad as claimed in claim 15, which is round off on its cut end face by slitting with said score cutter.

* * * * *